(12) United States Patent
Matsumoto

(10) Patent No.: US 12,458,450 B2
(45) Date of Patent: Nov. 4, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Tsuyoshi Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 82 days.

(21) Appl. No.: 18/177,082

(22) Filed: Mar. 1, 2023

(65) Prior Publication Data

US 2023/0320790 A1    Oct. 12, 2023

(30) Foreign Application Priority Data

Mar. 30, 2022    (JP) ................................. 2022-055673

(51) Int. Cl.
     *A61B 34/20*        (2016.01)
     *A61B 8/00*         (2006.01)
     *A61B 8/08*         (2006.01)

(52) U.S. Cl.
     CPC ............ *A61B 34/20* (2016.02); *A61B 8/0841* (2013.01); *A61B 8/0891* (2013.01);
     (Continued)

(58) Field of Classification Search
     CPC ..... A61B 34/20; A61B 8/0841; A61B 8/0891; A61B 8/4254; A61B 8/4263; A61B 8/463;
     (Continued)

(56) References Cited

U.S. PATENT DOCUMENTS 6,733,458 B1 * 5/2004 Steins .................. A61B 8/4254
                                                        600/461
2011/0245659 A1   10/2011 Ma et al.
                   (Continued)

FOREIGN PATENT DOCUMENTS

JP      2001-269339 A    10/2001
JP      2012-120747 A     6/2012
          (Continued)

OTHER PUBLICATIONS

The extended European search report issued by the European Patent Office on Aug. 24, 2023, which corresponds to European Patent Application No. 23161115.3-1126 and is related to U.S. Appl. No. 18/177,082.

(Continued)

*Primary Examiner* — Sean A Frith
(74) *Attorney, Agent, or Firm* — Studebaker Brackett PLLC

(57) ABSTRACT

There are provided an ultrasound diagnostic apparatus and a control method of the ultrasound diagnostic apparatus which allows an examiner to easily understand a depth reached by an insertion object in a case of inserting the insertion object into a blood vessel while capturing an ultrasound image representing a cross section of the blood vessel of the subject.

An ultrasound diagnostic apparatus includes an ultrasound probe; a monitor; an image acquisition unit that acquires ultrasound images of a plurality of frames in which a cross section of a blood vessel of a subject is consecutively imaged while the ultrasound probe is moved; an insertion object detection unit that detects an insertion object inserted into the subject, from each of the ultrasound images of the plurality of frames; and a superimposed display unit that superimposes at least one insertion object detected from the ultrasound images of the plurality of frames by the insertion (Continued)

object detection unit, on the ultrasound image of a latest frame among the ultrasound images of the plurality of frames, and displays the insertion object on the monitor.

14 Claims, 11 Drawing Sheets

(52) U.S. Cl.
CPC .......... *A61B 8/4254* (2013.01); *A61B 8/4263* (2013.01); *A61B 8/463* (2013.01); *A61B 8/5215* (2013.01); *A61B 2034/2063* (2016.02); *A61B 2034/2065* (2016.02)

(58) Field of Classification Search
CPC .......... A61B 8/5215; A61B 2034/2063; A61B 2034/2065
See application file for complete search history.

(56) References Cited

U.S. PATENT DOCUMENTS

| | | | |
|---|---|---|---|
| 2012/0078103 A1* | 3/2012 | Tashiro | A61B 8/461 600/443 |
| 2013/0261434 A1* | 10/2013 | Kim | A61B 8/5207 600/424 |
| 2014/0323854 A1 | 10/2014 | Takeda | |
| 2014/0371593 A1* | 12/2014 | Kondoh | A61B 8/0858 600/443 |
| 2015/0245819 A1* | 9/2015 | Yoshiara | A61B 8/0866 600/431 |
| 2016/0007972 A1* | 1/2016 | Nishiura | A61B 8/5269 600/437 |
| 2017/0119342 A1 | 5/2017 | Tsuruno | |
| 2018/0308247 A1* | 10/2018 | Gupta | G06T 7/62 |
| 2021/0068781 A1 | 3/2021 | Liu et al. | |
| 2022/0160335 A1 | 5/2022 | Matsumoto | |
| 2022/0175344 A1 | 6/2022 | Matsumoto | |
| 2023/0172583 A1 | 6/2023 | Ebata | |

FOREIGN PATENT DOCUMENTS

| | | |
|---|---|---|
| JP | 2014-050589 A | 3/2014 |
| JP | 2014-212922 A | 11/2014 |
| JP | 2017-080130 A | 5/2017 |
| JP | 2018023610 A * | 2/2018 |
| WO | 2017/138086 A1 | 8/2017 |
| WO | 2021/029153 A1 | 2/2021 |
| WO | 2021/033446 A1 | 2/2021 |
| WO | 2022/044400 A1 | 3/2022 |

OTHER PUBLICATIONS

An Office Action; "Notice of Reasons for Refusal," mailed by the Japanese Patent Office on Sep. 9, 2025, which corresponds to Japanese Patent Application No. 2022-055673 and is related to U.S. Appl. No. 18/177,082; with English language translation.

* cited by examiner

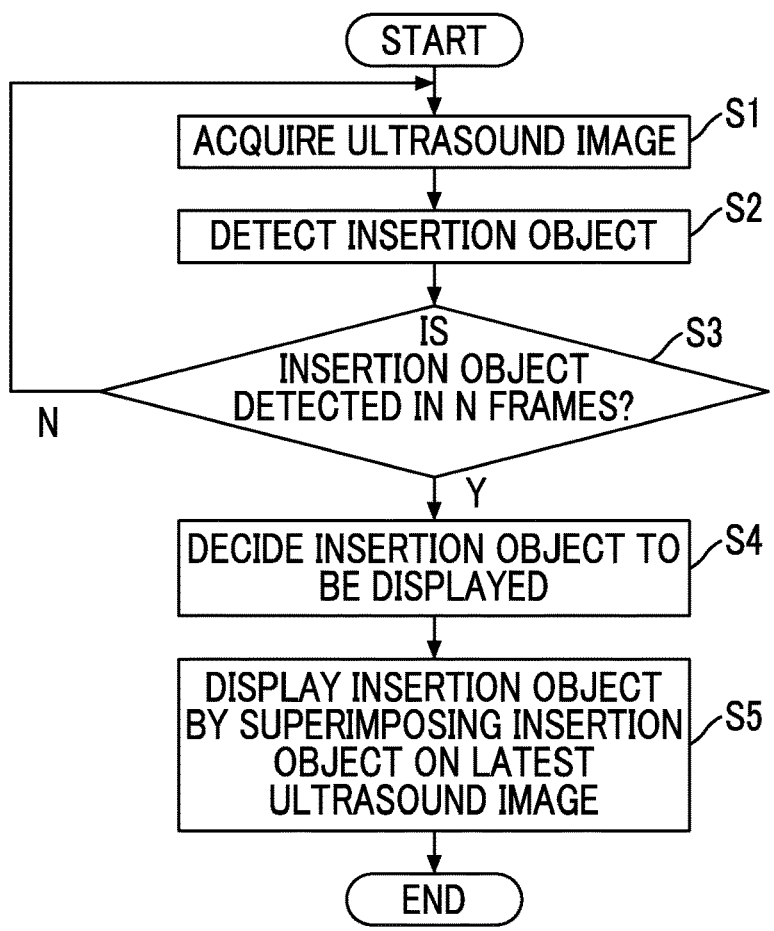
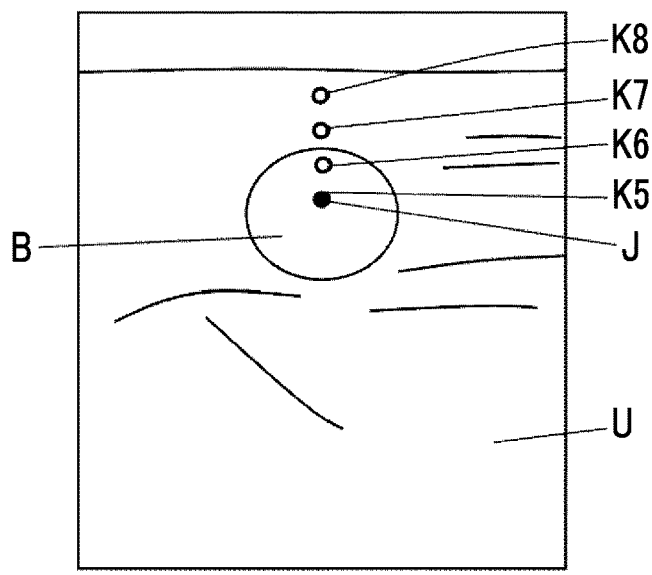

ULTRASOUND DIAGNOSTIC APPARATUS AND CONTROL METHOD OF ULTRASOUND DIAGNOSTIC APPARATUS

CROSS-REFERENCE TO RELATED APPLICATIONS

The present application claims priority under 35 U.S.C. § 119 to Japanese Patent Application No. 2022-055673, filed on Mar. 30, 2022. The above application is hereby expressly incorporated by reference, in its entirety, into the present application.

BACKGROUND OF THE INVENTION

1. Field of the Invention

The present invention relates to an ultrasound diagnostic apparatus, and a control method of the ultrasound diagnostic apparatus which are used for observing an insertion object inserted into a blood vessel of a subject.

2. Description of the Related Art

In the related art, a procedure of inserting an insertion object such as a so-called puncture needle into a blood vessel of a subject while observing the inside of the subject using a so-called ultrasound diagnostic apparatus is performed. An examiner can insert the insertion object into the blood vessel while checking the insertion object inserted into the blood vessel of the subject by checking an ultrasound image captured by the ultrasound diagnostic apparatus, but some skill level is often required for the ultrasonography in order to accurately understand the position of the insertion object from the ultrasound image.

In order to easily understand the position of the insertion object, for example, techniques disclosed in JP2014-212922A and JP2001-269339A have been developed. JP2014-212922A discloses that a distal end of the insertion object is detected on the basis of ultrasound images of a plurality of frames in which a longitudinal cross section of the insertion object is imaged, a trajectory of the distal end of the insertion object is calculated on the basis of the position of the distal end of the insertion object detected in the ultrasound images of the plurality of frames. JP2001-269339A discloses that the difference between ultrasound images of a plurality of consecutive frames in which the longitudinal cross section of the insertion object is imaged is calculated, and the trajectory of the insertion object is displayed on the basis of the calculated difference.

SUMMARY OF THE INVENTION

By the way, there is known a procedure of inserting an insertion object into a blood vessel while checking an ultrasound image in which cross sections of the blood vessel of the subject and the insertion object are imaged. In such a procedure, for example, the advance of the insertion object along a traveling direction of the blood vessel and the parallel movement of the ultrasound probe along the traveling direction of the blood vessel are often alternately repeated. In this case, since the entire image of the insertion object is not shown in the ultrasound image, even in a case where the techniques disclosed in JP2014-212922A and JP2001-269339A are used, it is difficult for an examiner with a low skill level or the like to understand the depth reached by the distal end of the insertion object in some cases.

The present invention has been made in order to solve such a problem in the related art, and an object thereof is to provide an ultrasound diagnostic apparatus and a control method of the ultrasound diagnostic apparatus which allows an examiner to easily understand the depth reached by the insertion object in a case of inserting the insertion object into the blood vessel while capturing the ultrasound image representing the cross section of the blood vessel of the subject.

In order to achieve the object, an ultrasound diagnostic apparatus according to an aspect of the present invention includes an ultrasound probe; a monitor; an image acquisition unit that acquires ultrasound images of a plurality of frames in which a cross section of a blood vessel of a subject is consecutively imaged while the ultrasound probe is moved; an insertion object detection unit that detects an insertion object inserted into the subject, from each of the ultrasound images of the plurality of frames; and a superimposed display unit that superimposes at least one insertion object detected from the ultrasound images of the plurality of frames by the insertion object detection unit, on the ultrasound image of a latest frame among the ultrasound images of the plurality of frames, and displays the insertion object on the monitor.

The superimposed display unit can superimpose and display at least the insertion object at a deepest position among a plurality of the insertion objects detected from the ultrasound images of the plurality of frames.

The superimposed display unit can superimpose and display a plurality of the insertion objects detected from the ultrasound images of the plurality of frames, by lowering brightness or saturation of the insertion object as the insertion object is the insertion object detected from the ultrasound image of a past frame.

The superimposed display unit can superimpose and display only the insertion object detected by the insertion object detection unit within a predetermined time range from the latest frame, among a plurality of the insertion objects detected from the ultrasound images of the plurality of frames.

The superimposed display unit can superimpose and display only the insertion object positioned within a predetermined depth range with respect to the insertion object detected from the ultrasound image of the latest frame, among a plurality of the insertion objects detected from the ultrasound images of the plurality of frames.

The superimposed display unit can superimpose and display only the insertion object positioned within a predetermined width range orthogonal to a depth direction with respect to the insertion object detected from the ultrasound image of the latest frame, among the plurality of insertion objects detected from the ultrasound images of the plurality of frames.

The ultrasound diagnostic apparatus can further include an angle detection unit that detects an angle of the ultrasound probe, and the superimposed display unit can superimpose and display only the insertion object detected by the insertion object detection unit in a case where the angle of the ultrasound probe detected by the angle detection unit is within a predetermined angle range.

The angle detection unit can include an angle sensor disposed in the ultrasound probe.

The angle detection unit can include an optical camera that images the ultrasound probe to acquire an optical image, and an optical image analysis unit that detects the angle of the ultrasound probe by analyzing the optical image acquired by the optical camera.

The ultrasound diagnostic apparatus can further include an ultrasound image analysis unit that calculates a brightness change rate of a plurality of the insertion objects detected from the ultrasound images of the plurality of frames, and the superimposed display unit can superimpose and display only the insertion object of which the brightness change rate calculated by the ultrasound image analysis unit is within a predetermined range.

The ultrasound diagnostic apparatus can further include an ultrasound image analysis unit that calculates a brightness change rate of a background image other than the insertion object in the ultrasound images of the plurality of frames, and the superimposed display unit can superimpose and display only the insertion object detected from the ultrasound image of the frame of which the brightness change rate of the background image calculated by the ultrasound image analysis unit is within a predetermined range.

The ultrasound diagnostic apparatus can further include a distal end detection unit that detects a distal end of the insertion object detected from the ultrasound images of the plurality of frames by the insertion object detection unit, and the superimposed display unit can superimpose and display only the distal end of the insertion object detected by the distal end detection unit.

A control method of an ultrasound diagnostic apparatus according to another aspect of the present invention includes acquiring ultrasound images of a plurality of frames in which a cross section of a blood vessel of a subject is consecutively imaged while an ultrasound probe is moved; detecting an insertion object inserted into the subject, from each of the ultrasound images of the plurality of frames; and superimposing at least one insertion object detected from the ultrasound images of the plurality of frames, on the ultrasound image of a latest frame among the ultrasound images of the plurality of frames, and displaying the insertion object on a monitor.

According to the present invention, an ultrasound diagnostic apparatus according to an aspect of the present invention includes an ultrasound probe; a monitor; an image acquisition unit that acquires ultrasound images of a plurality of frames in which a cross section of a blood vessel of a subject is consecutively imaged while the ultrasound probe is moved; an insertion object detection unit that detects an insertion object inserted into the subject, from each of the ultrasound images of the plurality of frames; and a superimposed display unit that superimposes at least one insertion object detected from the ultrasound images of the plurality of frames by the insertion object detection unit, on the ultrasound image of a latest frame among the ultrasound images of the plurality of frames, and displays the insertion object on the monitor. Therefore, it is possible for the examiner to easily understand the depth reached by the insertion object in a case of inserting the insertion object into the blood vessel while capturing the ultrasound image representing the cross section of the blood vessel of the subject.

BRIEF DESCRIPTION OF THE DRAWINGS

FIG. 7 is a flowchart illustrating an operation of the ultrasound diagnostic apparatus according to the first embodiment of the present invention.

FIG. 8 is a diagram schematically illustrating an example of an ultrasound image in which contour lines of a plurality of insertion objects detected from the ultrasound images of the plurality of frames are superimposed in a first modification example of the first embodiment of the present invention.

DESCRIPTION OF THE PREFERRED EMBODIMENTS

Hereinafter, embodiments of the invention will be described with reference to the accompanying drawings.

The description of configuration requirements described below is given on the basis of the representative embodiment of the present invention, but the present invention is not limited to such an embodiment.

In the present specification, a numerical range represented using "to" means a range including the numerical values before and after "to" as a lower limit value and an upper limit value.

In the present specification, the terms "same" and "identical" include an error range generally allowed in the technical field.

First Embodiment

Figure 1:
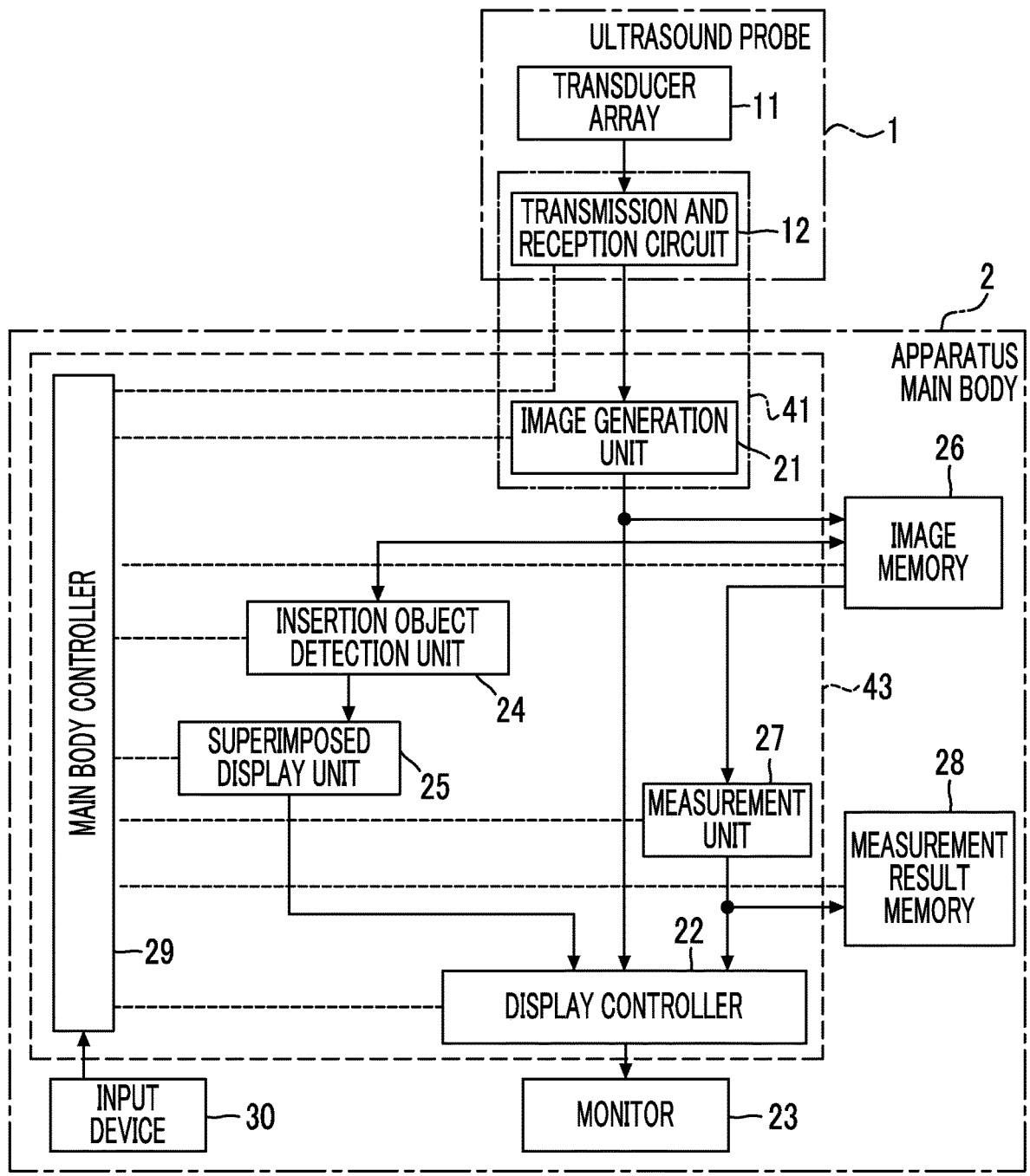
FIG. 1 is a block diagram illustrating a configuration of an ultrasound diagnostic apparatus according to a first embodiment of the present invention.

FIG. 1 illustrates a configuration of an ultrasound diagnostic apparatus according to a first embodiment of the present invention. The ultrasound diagnostic apparatus includes an ultrasound probe 1, and an apparatus main body 2 connected to the ultrasound probe 1. For example, the ultrasound diagnostic apparatus is used for observing a blood vessel of a subject and an insertion object inserted into the blood vessel, in a procedure of inserting the insertion object such as a so-called puncture needle into the blood vessel of the subject.

The ultrasound probe 1 has a transducer array 11. A transmission and reception circuit 12 is connected to the transducer array 11.

The apparatus main body 2 has an image generation unit 21 connected to the transmission and reception circuit 12 of the ultrasound probe 1. Further, a display controller 22 and a monitor 23 are sequentially connected to the image generation unit 21. An image memory 26 is connected to the image generation unit 21. An insertion object detection unit 24 is connected to the image memory 26. A superimposed display unit 25 is connected to the insertion object detection unit 24. The superimposed display unit 25 is connected to the display controller 22. A measurement unit 27 is connected to the image memory 26. A measurement result memory 28 and the display controller 22 are connected to the measurement unit 27.

In addition, a main body controller 29 is connected to the transmission and reception circuit 12, the image generation unit 21, the display controller 22, the insertion object detection unit 24, the superimposed display unit 25, the image memory 26, the measurement unit 27, and the measurement result memory 28. An input device 30 is connected to the main body controller 29.

The transmission and reception circuit 12 of the ultrasound probe 1 and the image generation unit 21 of the apparatus main body 2 constitute an image acquisition unit 41. Further, the image generation unit 21, the display controller 22, the insertion object detection unit 24, the superimposed display unit 25, the measurement unit 27, and the main body controller 29 constitute a processor 43 for the apparatus main body 2.

The transducer array 11 of the ultrasound probe 1 has a plurality of ultrasonic transducers arranged in a one-dimensional or two-dimensional manner. According to a drive signal supplied from the transmission and reception circuit 12, each of the ultrasonic transducers transmits an ultrasonic wave and receives an ultrasound echo from the subject to output a signal based on the ultrasound echo. For example, each ultrasonic transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
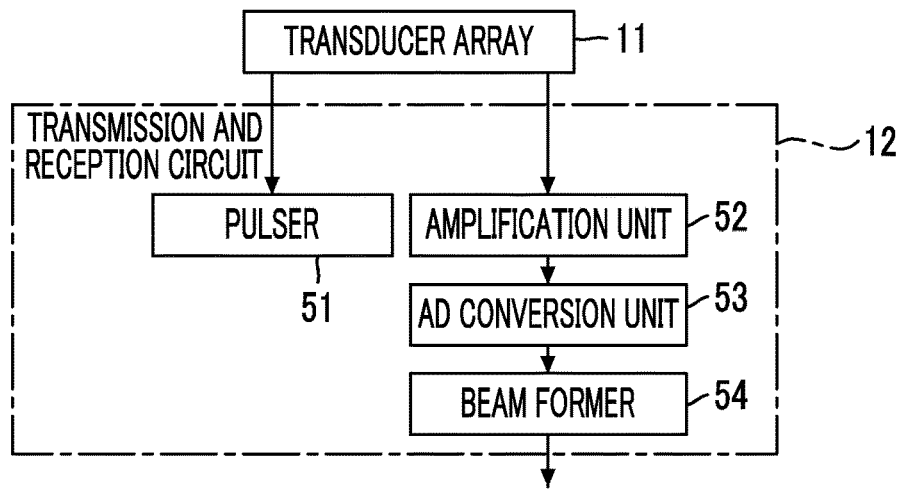
FIG. 2 is a block diagram illustrating a configuration of a transmission and reception circuit in the first embodiment of the present invention.

The transmission and reception circuit 12 causes the transducer array 11 to transmit the ultrasonic wave and generates a sound ray signal on the basis of a reception signal acquired by the transducer array 11, under the control of the main body controller 29. As illustrated in FIG. 2, the transmission and reception circuit 12 has a pulser 51 connected to the transducer array 11, and an amplification unit 52, an analog to digital (AD) conversion unit 53, and a beam former 54 that are sequentially connected in series from the transducer array 11.

The pulser 51 includes, for example, a plurality of pulse generators, and the pulser 51 adjusts the amount of delay of each drive signal so that ultrasonic waves transmitted from the plurality of ultrasonic transducers of the transducer array 11 form an ultrasound beam on the basis of a transmission delay pattern selected according to the control signal from the main body controller 29, and supplies the obtained signals to the plurality of ultrasonic transducers. Thus, in a case where a pulsed or continuous-wave voltage is applied to the electrodes of the ultrasonic transducers of the transducer array 11, the piezoelectric body expands and contracts to generate pulsed or continuous-wave ultrasonic waves from each ultrasonic transducer. From the combined wave of these ultrasonic waves, an ultrasound beam is formed.

The transmitted ultrasound beam is reflected by a target, for example, a site of the subject, and propagates toward the transducer array 11 of the ultrasound probe 1. The ultrasound echo propagating toward the transducer array 11 in this manner is received by each ultrasonic transducer constituting the transducer array 11. In this case, each ultrasonic transducer constituting the transducer array 11 expands and contracts by receiving the propagating ultrasound echo to generate a reception signal that is an electric signal, and outputs the reception signal to the amplification unit 52.

The amplification unit 52 amplifies the signals input from each ultrasonic transducer constituting the transducer array 11, and transmits the amplified signals to the AD conversion unit 53. The AD conversion unit 53 converts the signal transmitted from the amplification unit 52 into digital reception data. The beam former 54 performs so-called reception focusing processing in which addition is performed by giving delays to respective pieces of the reception data received from the AD conversion unit 53. Through the reception focusing processing, a sound ray signal in which each piece of the reception data converted by the AD conversion unit 53 is phased and added and the focus of the ultrasound echo is narrowed is acquired.

Figure 3:
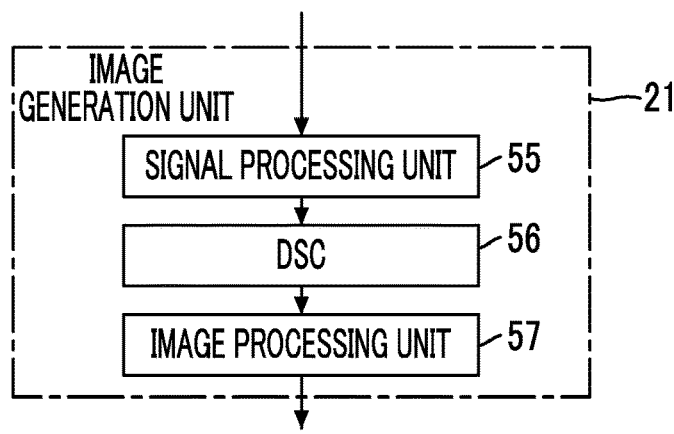
FIG. 3 is a block diagram illustrating a configuration of an image generation unit in the first embodiment of the present invention.

As illustrated in FIG. 3, the image generation unit 21 has a configuration in which a signal processing unit 55, a digital scan converter (DSC) 56, and an image processing unit 57 are sequentially connected in series.

The signal processing unit 55 generates a B-mode image signal, which is tomographic image information regarding tissues inside the subject, by performing, on the sound ray signal received from the transmission and reception circuit 12, correction of the attenuation due to the distance according to the depth of the reflection position of the ultrasonic wave using a sound speed value set by the main body controller 29 and then performing envelope detection processing.

The DSC 56 converts (raster conversion) the B-mode image signal generated by the signal processing unit 55 into an image signal according to a normal television signal scanning method.

The image processing unit 57 performs various kinds of necessary image processing such as gradation processing on the B-mode image signal input from the DSC 56, and then sends the B-mode image signal to the display controller 22 and the image memory 26. In the following, the B-mode image signal subjected to the image processing by the image processing unit 57 is simply referred to as an ultrasound image.

The display controller 22 performs predetermined processing on the ultrasound image or the like generated by the image generation unit 21 and displays the ultrasound image or the like on the monitor 23, under the control of the main body controller 29.

The monitor 23 performs various kinds of display under the control of the display controller 22. The monitor 23 can include a display device such as a liquid crystal display (LCD), or an organic electroluminescence (EL) display.

The image memory 26 stores the ultrasound image generated by the image generation unit 21 under the control of the main body controller 29. Although details will be described later, the image memory 26 can store information on the insertion object detected from the ultrasound image by the insertion object detection unit 24 in association with the corresponding ultrasound image.

Here, as the image memory 26, for example, recording media such as a flash memory, a hard disk drive (HDD), a solid state drive (SSD), a flexible disk (FD), a magneto-optical disk (MO disk), a magnetic tape (MT), a random access memory (RAM), a compact disc (CD), a digital versatile disc (DVD), a secure digital card (SD card), or a universal serial bus memory (USB memory) can be used.

By the way, in general, there is known a procedure of capturing an ultrasound image representing the cross sections of the blood vessel of the subject and the insertion object such as a puncture needle, and inserting the insertion object into the blood vessel approximately along the traveling direction of the blood vessel while checking the captured ultrasound image. Here, the cross section of the blood vessel refers to a tomographic plane of the blood vessel, which intersects the traveling direction of the blood vessel. The cross section of the insertion object refers to a tomographic plane of the insertion object, which intersects a direction in which the insertion object extends.

Figure 4:
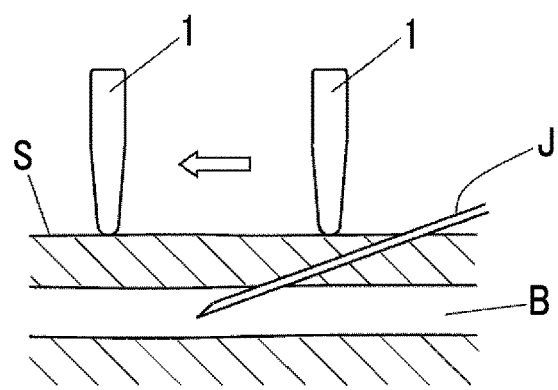
FIG. 4 is a diagram illustrating an example of a positional relationship between an ultrasound probe and an insertion object in the first embodiment of the present invention.
Figure 5:
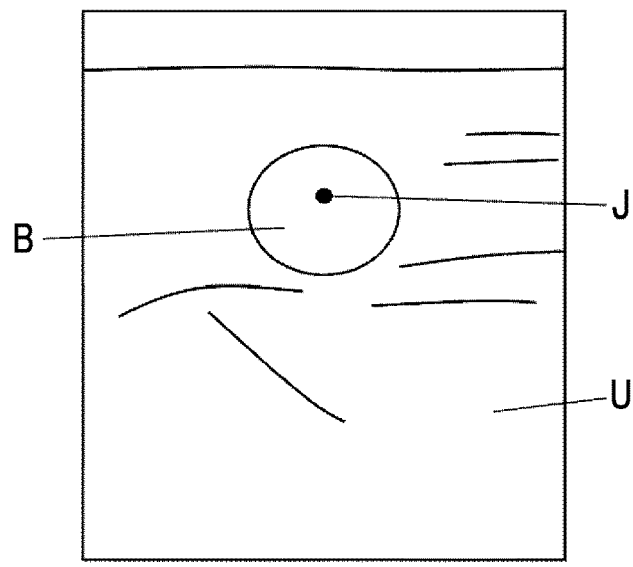
FIG. 5 is a diagram schematically illustrating an insertion object detected from an ultrasound image in the first embodiment of the present invention.

In such a procedure, as illustrated in FIG. 4, generally, the advance of an insertion object J along the traveling direction of a blood vessel B and the parallel movement of the ultrasound probe 1 on a body surface S of the subject along the traveling direction of the blood vessel B are often alternately repeated. That is, the advance of the insertion object J and the parallel movement of the ultrasound probe 1 are often alternately repeated such that the insertion object J advances in the blood vessel B along the traveling direction of the blood vessel B, then the ultrasound probe 1 is moved in parallel on the body surface S of the subject along the traveling direction of the blood vessel B, and further the insertion object J advances in the blood vessel B along the traveling direction of the blood vessel B. Thereby, for example, as illustrated in FIG. 5, an ultrasound image U in which the cross section of the insertion object J is shown inside the cross section of the blood vessel B.

The insertion object detection unit 24 analyzes the ultrasound images U of the plurality of frames consecutively generated by the image generation unit 21 while the ultrasound probe 1 is moved by the examiner, and detects the insertion object J inserted into the subject from each of the ultrasound images U of the plurality of frames.

For example, the insertion object detection unit 24 can detect the insertion object J by using a so-called binarization method or a segmentation algorithm such as a so-called watershed method. Further, the insertion object detection unit 24 can detect the insertion object J, for example, by storing a plurality of different template images representing the cross section of the insertion object J, and searching the ultrasound images U by a so-called template matching method using the plurality of template images. The insertion object detection unit 24 can detect the insertion object J by using, for example, a machine learning method described in Csurka et al.: Visual Categorization with Bags of Keypoints, Proc. of ECCV Workshop on Statistical Learning in Computer Vision, pp. 59-74 (2004), or a general image recognition method using deep learning described in Krizhevsk et al.: ImageNet Classification with Deep Convolutional Neural Networks, Advances in Neural Information Processing Systems 25, pp. 1106-1114 (2012).

The insertion object detection unit 24 sends the information on the detected insertion object J to the superimposed display unit 25. The information on the detected insertion object J includes, for example, the position and shape of the insertion object J in the ultrasound image U. The insertion object detection unit 24 can send the information on the detected insertion object J in association with the ultrasound image U used in the detection processing, to the image memory 26. The image memory 26 can store the information on the insertion object J received from the insertion object detection unit 24 in association with the corresponding ultrasound image U.

Figure 6:
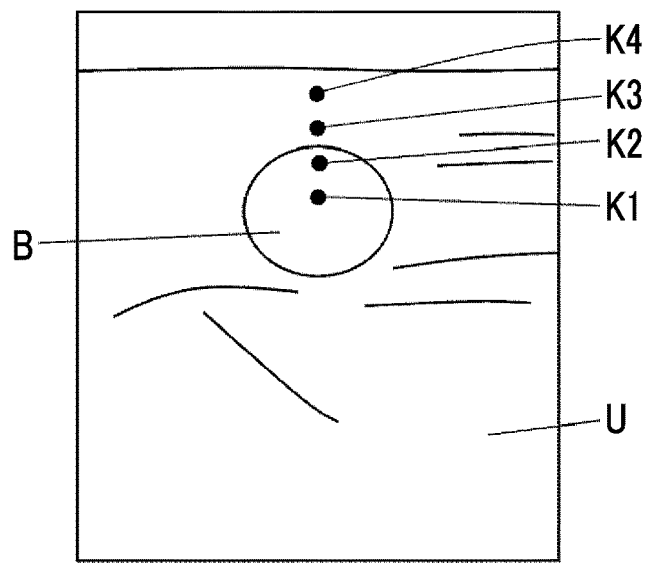
FIG. 6 is a diagram schematically illustrating an example of an ultrasound image in which a plurality of insertion objects detected from ultrasound images of a plurality of frames are superimposed in the first embodiment of the present invention.

The superimposed display unit 25 displays at least one insertion object J detected from the ultrasound images U of the plurality of consecutive frames by the insertion object detection unit 24 on the monitor 23 by superimposing the at least one insertion object J on the ultrasound image U of the latest frame among the ultrasound images U of the plurality of frames consecutively generated by the image generation unit 21. Here, the ultrasound image of the latest frame is included in the ultrasound images U of the plurality of consecutive frames. For example, as illustrated in FIG. 6, the superimposed display unit 25 can display insertion objects K1, K2, K3, and K4 displayed in an emphasized manner by filling or the like the region of the insertion object J detected by the insertion object detection unit 24 from the ultrasound images U of the plurality of frames on the monitor 23 by superimposing the insertion objects K1, K2, K3, and K4 on the ultrasound image U of the latest frame.

The measurement unit 27 reads out the ultrasound image U stored in the image memory 26, and measures the dimension or the like of, for example, the imaged blood vessel B on the basis of the read-out ultrasound image U, under the control of the main body controller 29. The measurement unit 27 can perform the measurement on the basis of the input operation by the examiner via the input device 30, for example.

The measurement result memory 28 stores the measurement result by the measurement unit 27 in association with the ultrasound image U used for the measurement, under the control of the main body controller 29. As the measurement result memory 28, for example, recording media such as a flash memory, an HDD, an SSD, an FD, an MO disk, an MT, a RAM, a CD, a DVD, an SD card, or a USB memory can be used.

The input device 30 accepts the input operation by the examiner, and sends the input information to the main body controller 29. The input device 30 is configured by, for example, a device for the examiner to perform an input operation, such as a keyboard, a mouse, a trackball, a touchpad, a touch panel, or the like.

The processor 43 configured by the image generation unit 21, the display controller 22, the insertion object detection unit 24, the superimposed display unit 25, the measurement unit 27, and the main body controller 29 of the apparatus main body 2 is configured by a central processing unit (CPU) and a control program for causing the CPU to execute various kinds of processing, but the processor 43 may be configured by using a field programmable gate array (FPGA), a digital signal processor (DSP), an application specific integrated circuit (ASIC), a graphics processing unit (GPU), or another integrated circuit (IC) or may be configured by a combination thereof.

Further, the image generation unit 21, the display controller 22, the insertion object detection unit 24, the superimposed display unit 25, the measurement unit 27, and the main body controller 29 of the processor 43 can also be configured by being integrated partially or entirely into one CPU or the like.

Next, an example of the operation of the ultrasound diagnostic apparatus according to the first embodiment will be described using the flowchart illustrated in FIG. 7.

First, in Step S1, in a state where the ultrasound probe 1 is disposed on the body surface S of the subject by the examiner, the ultrasound image U is acquired by the image acquisition unit 41. In this case, the reception signals are generated by the transducer array 11 of the ultrasound probe 1 transmitting the ultrasound beams into the subject and receiving the ultrasound echoes from the subject. The transmission and reception circuit 12 of the image acquisition unit 41 performs so-called reception focusing processing on the reception signals to generate sound ray signals, under the control of the main body controller 29. The sound ray signals generated by the transmission and reception circuit 12 are sent to the image generation unit 21. The image generation unit 21 generates the ultrasound image U using the sound ray signals sent from the transmission and reception circuit 12.

Next, in Step S2, the insertion object detection unit 24 analyzes the ultrasound image U acquired in Step S1, and detects the insertion object J from the ultrasound image U. The insertion object detection unit 24 can detect the insertion object J by using, for example, a segmentation algorithm, template matching, machine learning, a general image recognition method using deep learning or the like. Further, the insertion object detection unit 24 sends the information on the detected insertion object J to the superimposed display unit 25.

In Step S3, the superimposed display unit 25 determines whether or not the insertion object J is detected by the insertion object detection unit 24 in the ultrasound images U of predetermined N frames after the ultrasonography is started. Here, a number equal to or greater than 2 can be set as N, which is the predetermined number of frames. In a case where it is determined that the insertion object J is not detected in the ultrasound images U of the predetermined N frames, the processing returns to Step S1, and the ultrasound image U is newly acquired.

In this manner, the processing of Step S1 to Step S3 is repeated until it is determined in Step S3 that the insertion object J is detected in the ultrasound images U of the predetermined N frames. While Step S1 to Step S3 are repeated, the ultrasound images U of the plurality of consecutive frames are acquired while the ultrasound probe 1 is moved in parallel on the body surface S of the subject by the examiner. In this case, for example, the ultrasound probe 1 is moved from a position overlapping a middle portion of the insertion object J to a position beyond the distal end of the insertion object J via a position overlapping the distal end of the insertion object J. Therefore, by repeating Step S1 to Step S3, for example, the ultrasound image U in which the cross section of the middle portion of the insertion object J is shown, the ultrasound image U in which the cross section of the distal end of the insertion object J is shown, and the ultrasound image U in which the insertion object J is not shown are acquired. Generally, as the cross section of a portion is closer to the distal end of the insertion object J, the cross section of the portion is positioned at a deep portion in the ultrasound image U.

In this case, the examiner alternately performs the parallel movement of the ultrasound probe 1 and the advance of the insertion object J into the subject as illustrated in FIG. 4, for example. As illustrated in FIG. 4, since the insertion object J is inserted into the subject by being slightly inclined toward the deeper side of the subject approximately along the traveling direction of the blood vessel B, in a case where the examiner inserts the insertion object J into the blood vessel B through the so-called anterior vascular wall, the distal end of the insertion object J gradually approaches the posterior vascular wall.

As a result of repeating the processing of Step S1 to Step S3 in this manner, in a case where it is determined in Step S3 that the insertion object J is detected in the ultrasound images U of the predetermined N frames, the processing proceeds to Step S4.

In Step S4, the superimposed display unit 25 decides at least one insertion object J to be displayed on the monitor 23 among a plurality of insertion objects J detected by repeating Step S1 to Step S3. For example, the superimposed display unit 25 can decide all the insertion objects J detected by repeating Step S1 to Step S3, as the insertion object J to be displayed on the monitor 23.

In Step S5, the superimposed display unit 25 superimposes and displays the insertion object J, which is decided as the insertion object J to be displayed on the monitor 23 in Step S4, on the ultrasound image U of the latest frame. For example, as illustrated in FIG. 6, the superimposed display unit 25 can display the insertion objects K1, K2, K3, and K4 each detected from the ultrasound images U of the plurality of frames on the monitor 23 in an emphasized manner by filling or the like the insertion objects K1, K2, K3, and K4 with a different color from other regions in the ultrasound image U.

In this manner, the insertion objects K1, K2, K3, and K4 detected from the ultrasound images U of the plurality of frames, that is, the history of the depth position of the insertion object J inserted into the subject is superimposed and displayed on the ultrasound image U of the latest frame, and thereby the examiner can easily understand the current depth position of the insertion object J inserted into the subject. Further, in a case where the examiner causes the insertion object J to advance in the subject, the distal end of the insertion object J gradually approaches the posterior vascular wall, but by checking the insertion objects K1, K2, K3, and K4 superimposed and displayed on the ultrasound image U to understand the depth position of the insertion object J, the examiner can, for example, easily adjust the advance of the insertion object J, and prevent accidents such as penetration of the posterior vascular wall by the insertion object J.

In a case where the processing of Step S5 is completed in this manner, the operation of the ultrasound diagnostic apparatus according to the flowchart of FIG. 7 is ended.

As described above, with the ultrasound diagnostic apparatus according to the first embodiment, the insertion object detection unit 24 detects the insertion object J inserted into the subject from each of the ultrasound images U of the plurality of consecutive frames acquired by the image acquisition unit 41, and the superimposed display unit 25 displays at least one insertion object J detected from the ultrasound images U of the plurality of frames on the monitor 23 by superimposing the at least one insertion object J on the ultrasound image U of the latest frame. Therefore, in a case where the insertion object J is inserted into the blood vessel B while capturing the ultrasound image U representing the cross section of the blood vessel B of the subject, it is possible for the examiner to easily understand the depth reached by the insertion object J. Therefore, the examiner can reliably cause the insertion object J to advance to an appropriate position in the blood vessel B, and prevent accidents such as penetration of the blood vessel B by the insertion object J.

The description has been made in which the image generation unit 21 is included in the apparatus main body 2, but the image generation unit 21 can be included in the ultrasound probe 1 instead of being included in the apparatus main body 2.

The superimposed display unit 25 can decide at least one insertion object at the deepest position among the plurality of insertion objects K1, K2, K3, and K4 detected from the ultrasound images U of the plurality of frames by the insertion object detection unit 24, as the insertion object J to be displayed on the monitor 23 in Step S4, and can superimpose and display the decided insertion object J on the ultrasound image U of the latest frame in Step S5. Thereby, it is possible for the examiner to easily understand in which depth range the insertion object J currently inserted into the subject is positioned.

The superimposed display unit 25 can superimpose and display the plurality of insertion objects K1, K2, K3, and K4 detected from the ultrasound images U of the plurality of frames by the insertion object detection unit 24, on the ultrasound image U of the latest frame by lowering the brightness or saturation thereof as the insertion object is the insertion objects K1, K2, K3, and K4 detected from the ultrasound image U of the past frame, that is, detected from the ultrasound image U of the frame acquired in the past. Thereby, it is possible for the examiner to easily check the time-series order in which the plurality of insertion objects K1, K2, K3, and K4 superimposed on the ultrasound image U are detected, and to easily check the advance direction of the insertion object J in the depth direction.

In this case, the superimposed display unit 25 can decide only the insertion object detected by the insertion object detection unit 24 within a predetermined time range to the past from the time point at which the latest frame is acquired, among the plurality of insertion objects K1, K2, K3, and K4 detected from the ultrasound images U of the plurality of frames by the insertion object detection unit 24, as the insertion object J to be displayed on the monitor 23 in Step S4, and can superimpose and display the decided insertion object J on the ultrasound image U of the latest frame in Step S5. Thereby, it is possible for the examiner to easily understand in which depth range the insertion object J currently inserted into the subject is positioned.

The superimposed display unit 25 can decide only the insertion object positioned within a predetermined depth range with respect to the insertion object K1 detected from the ultrasound image U of the latest frame among the plurality of insertion objects K1, K2, K3, and K4 detected from the ultrasound images U of the plurality of frames by the insertion object detection unit 24, as the insertion object J to be displayed on the monitor 23 in Step S4, and can superimpose and display the decided insertion object J on the ultrasound image U of the latest frame in Step S5.

For example, the superimposed display unit 25 can set a range that is positioned at the center of the ultrasound image U in the depth direction and has a predetermined dimension in the depth direction, as the predetermined depth range. For example, the superimposed display unit 25 can detect the blood vessel B from the ultrasound image U by the method such as template matching, and set a range from one end to the other end of the blood vessel B in the depth direction, as the predetermined depth range.

In this manner, even in a case where only the insertion object positioned within the predetermined depth range is displayed, it is possible for the examiner to easily understand in which depth range the insertion object J currently inserted into the subject is positioned.

Further, the superimposed display unit 25 can decide only the insertion object positioned within a predetermined width range in a width direction orthogonal to the depth direction, with respect to the insertion object K1 detected from the ultrasound image U of the latest frame among the plurality of insertion objects K1, K2, K3, and K4 detected from the ultrasound images U of the plurality of frames by the insertion object detection unit 24, as the insertion object J to be displayed on the monitor 23, and can superimpose and display the decided insertion object J on the ultrasound image U of the latest frame in Step S5.

For example, the superimposed display unit 25 can set a range that is positioned at the center of the ultrasound image U in the width direction and has a predetermined dimension in the width direction, as the predetermined width range. For example, the superimposed display unit 25 can detect the blood vessel B from the ultrasound image U by the method such as template matching, and set a range from one end to the other end of the blood vessel B in the width direction, as the predetermined width range. In a case where the insertion object J is inserted into the blood vessel B, since the distal end of the insertion object J is normally positioned within a range from one end to the other end of the blood vessel B in the width direction, even in a case where only the insertion object positioned within the predetermined width range is displayed, it is possible for the examiner to easily understand in which depth range the insertion object J currently inserted into the subject is positioned.

It has been described that the insertion objects K1, K2, K3, and K4 each detected from the ultrasound images U of the plurality of frames by the insertion object detection unit 24 are displayed on the monitor 23 in an emphasized manner by filling the insertion objects K1, K2, K3, and K4 with a different color from the other regions in the ultrasound image U, but the method of displaying the insertion objects K1, K2, K3, and K4 is not particularly limited.

For example, as illustrated in FIG. 8, the superimposed display unit 25 can superimpose, on the ultrasound image U of the latest frame, contour lines K5, K6, K7, and K8 of insertion objects each detected from the ultrasound images U of the plurality of frames by the insertion object detection unit 24, as marks representing the insertion objects. In this case, since the insertion object J detected from the ultrasound image U of the latest frame is not covered, the examiner can clearly understand the current position of the insertion object J.

Figure 9:
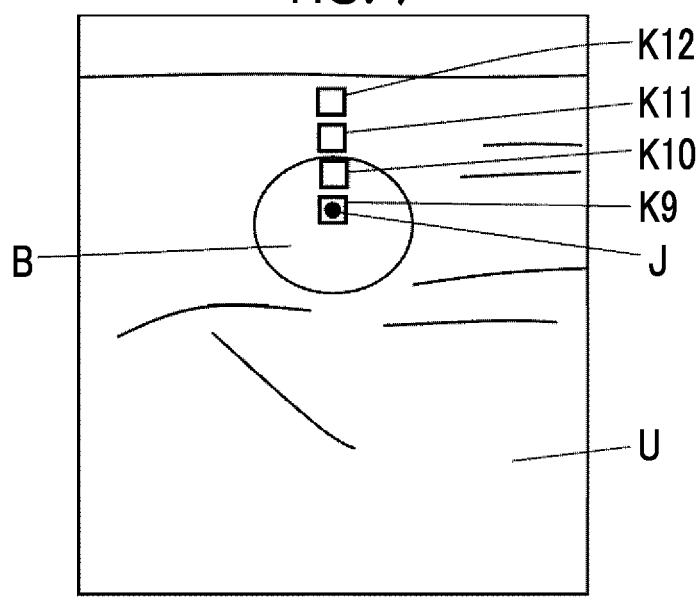
FIG. 9 is a diagram schematically illustrating an example of an ultrasound image in which a plurality of figures surrounding a plurality of insertion objects detected from the ultrasound images of the plurality of frames are superimposed in a second modification example of the first embodiment of the present invention.

For example, as illustrated in FIG. 9, the superimposed display unit 25 can superimpose, on the ultrasound image U of the latest frame, a plurality of figures K9, K10, K11, and K12 surrounding insertion objects each detected from the ultrasound images U of the plurality of frames by the insertion object detection unit 24, as marks representing the insertion objects. In the example of FIG. 9, the rectangular figures K9, K10, K11, and K12 are superimposed on the ultrasound image U of the latest frame. Even in this case, since the insertion object J detected from the ultrasound image U of the latest frame is not covered, the examiner can clearly understand the current position of the insertion object J. The shapes of the figures K9, K10, K11, and K12 are not particularly limited as long as the shapes do not cover the insertion object J detected from the ultrasound image U of the latest frame.

Figure 10:
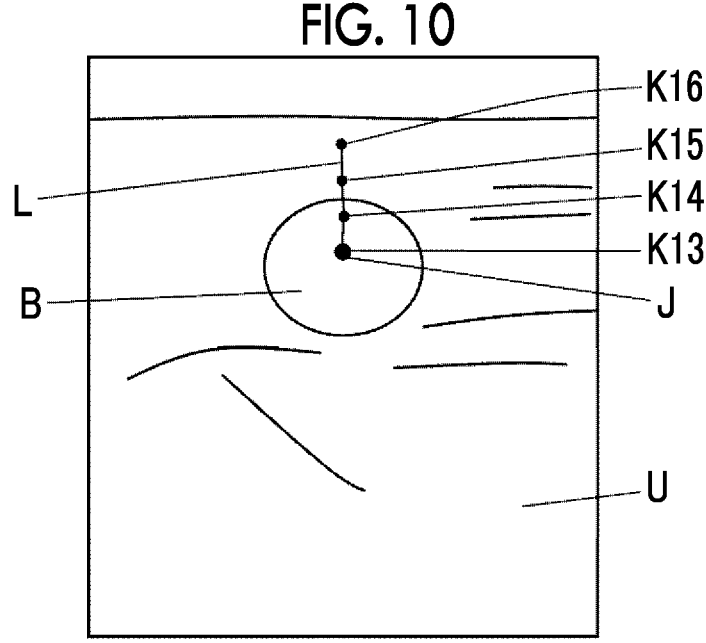
FIG. 10 is a diagram schematically illustrating an example of an ultrasound image in which center points of a plurality of insertion objects detected from the ultrasound images of the plurality of frames and a connection line connecting the center points are superimposed in a third modification example of the first embodiment of the present invention.

For example, as illustrated in FIG. 10, the superimposed display unit 25 can superimpose, on the ultrasound image U of the latest frame, center points K13, K14, K15, and K16 of insertion objects each detected from the ultrasound images U of the plurality of frames by the insertion object detection unit 24, as marks representing the insertion objects. Even in this case, since the insertion object J detected from the ultrasound image U of the latest frame is not covered, the examiner can clearly understand the current position of the insertion object J. The superimposed display unit 25 can further display a connection line L connecting the plurality of center points K13, K14, K15, and K16 on the ultrasound image U of the latest frame. The examiner can reliably cause the insertion object J to advance to an appropriate position in the blood vessel B while easily understanding the trajectory of the advance of the insertion object J in the depth direction by checking the connection line L.

Figure 11:
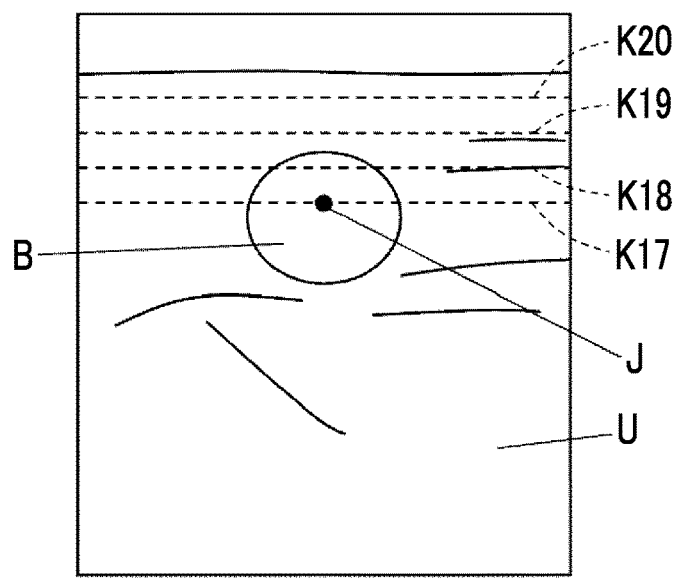
FIG. 11 is a diagram schematically illustrating an example of an ultrasound image in which a plurality of lateral lines arranged at depth positions of a plurality of insertion objects detected from the ultrasound images of the plurality of frames are superimposed in a fourth modification example of the first embodiment of the present invention.

For example, as illustrated in FIG. 11, the superimposed display unit 25 can superimpose, on the ultrasound image U of the latest frame, a plurality of lateral lines K17, K18, K19, and K$_2$O arranged at the depth positions of insertion objects each detected from the ultrasound images U of the plurality of frames by the insertion object detection unit 24, as marks representing the insertion objects. The examiner can easily understand the depth position of the insertion object J by checking the plurality of lateral lines K17, K18, K19, and K20.

Figure 12:
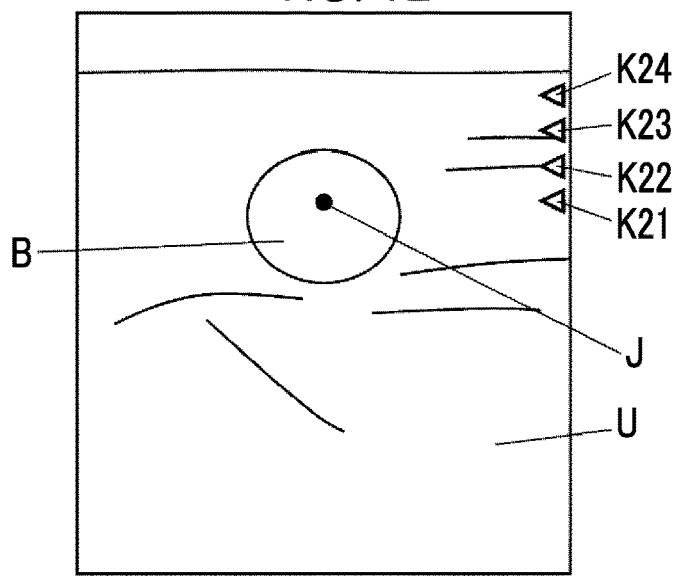
FIG. 12 is a diagram schematically illustrating an example of an ultrasound image in which a plurality of indicators corresponding to depth positions of a plurality of insertion objects detected from the ultrasound images of the plurality of frames are superimposed in a fifth modification example of the first embodiment of the present invention.

For example, as illustrated in FIG. 12, the superimposed display unit 25 can superimpose, on the ultrasound image U of the latest frame, a plurality of indicators K21, K22, K23, and K24 arranged at the depth positions of insertion objects each detected from the ultrasound images U of the plurality of frames by the insertion object detection unit 24, as marks representing the insertion objects. Even in this case, the examiner can easily understand the depth position of the insertion object J by checking the plurality of indicators K21, K22, K23, and K24.

Second Embodiment

In a case where the insertion object J is inserted into a blood vessel B while the ultrasound image U in which the cross section of the blood vessel B of the subject is imaged is observed, the examiner accurately understands the depth position of the insertion object J, and therefore, it is preferable to acquire the ultrasound image U representing the tomographic plane substantially perpendicular to the traveling direction of the blood vessel B. Thus, for example, only in a case where the angle of the ultrasound probe 1 is within a predetermined angle range, the ultrasound diagnostic apparatus can superimpose and display the detected insertion object J on the ultrasound image U.

Figure 13:
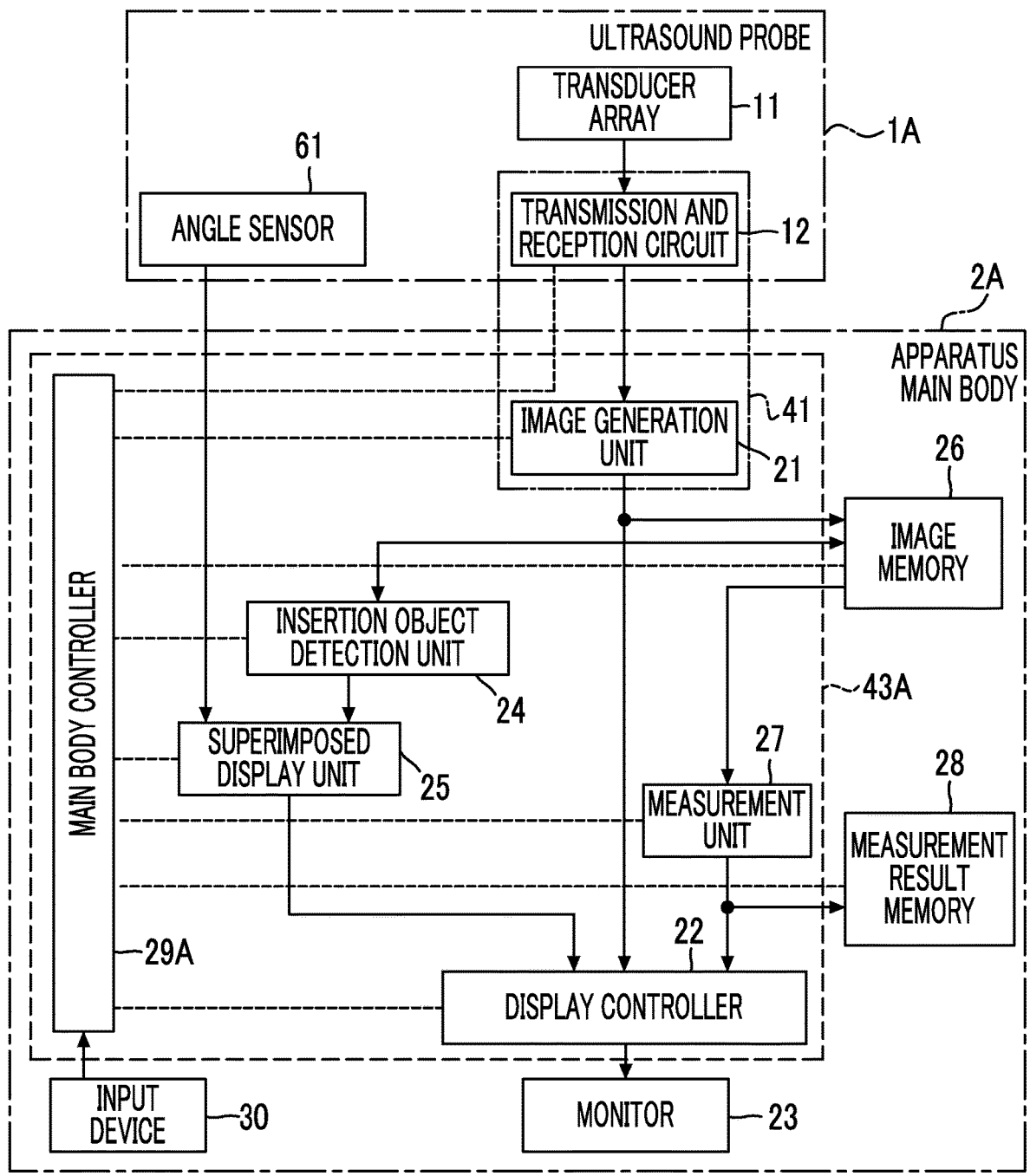
FIG. 13 is a block diagram illustrating a configuration of an ultrasound diagnostic apparatus according to a second embodiment of the present invention.

FIG. 13 illustrates a configuration of an ultrasound diagnostic apparatus according to a second embodiment. The ultrasound diagnostic apparatus of the second embodiment is obtained by including an ultrasound probe 1A instead of the ultrasound probe 1 and including an apparatus main body 2A instead of the apparatus main body 2 in the ultrasound diagnostic apparatus of the first embodiment illustrated in FIG. 1.

The ultrasound probe 1A is obtained by adding an angle sensor 61 to the ultrasound probe 1 in the first embodiment.

The apparatus main body 2A is obtained by including a main body controller 29A instead of the main body controller 29 in the apparatus main body 2 in the first embodiment.

The superimposed display unit 25 of the apparatus main body 2A is connected to the angle sensor 61 of the ultrasound probe 1A. Further, the image generation unit 21, the display controller 22, the insertion object detection unit 24, the superimposed display unit 25, the measurement unit 27, and the main body controller 29A constitute a processor 43A for the apparatus main body 2A.

Figure 14:
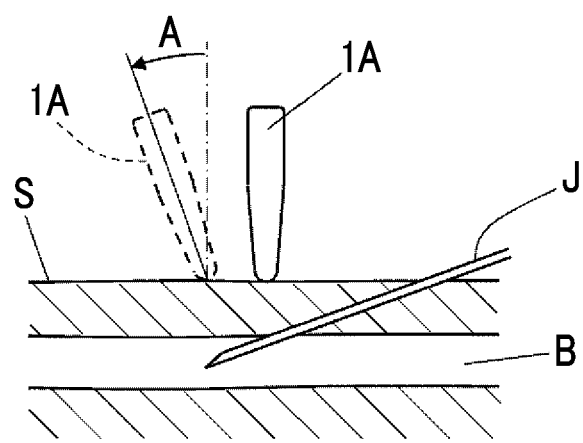
FIG. 14 is a diagram illustrating an example of an inclined ultrasound probe in the second embodiment of the present invention.

The angle sensor 61 of the ultrasound probe 1A is a sensor that detects an angle A of the ultrasound probe 1A as illustrated in FIG. 14. For example, the angle sensor 61 can detect the angle A at which the ultrasound probe 1A is inclined, with a case where the distal end of the ultrasound probe 1A faces downward in the vertical direction as 0 degrees. For example, the angle sensor 61 can be configured by a known sensor device such as a so-called acceleration sensor or a so-called gyro sensor.

The superimposed display unit 25 determines whether or not the angle A of the ultrasound probe 1A detected by the angle sensor 61 is within the predetermined angle range, and can superimpose and display only the insertion object J detected by the insertion object detection unit 24 on the ultrasound image U of the latest frame in a case where the angle A is within the angle range. In this case, the superimposed display unit 25 can set a reference angle of the predetermined angle range, that is, a central angle in the predetermined angle range on the basis of the input operation by the examiner via the input device 30, for example. In this case, the predetermined angle range is a constant angle range based on the central angle. Thereby, only the insertion object J detected from the ultrasound image U representing the tomographic plane substantially perpendicular to the traveling direction of the blood vessel B of the subject can be superimposed and displayed on the ultrasound image U.

In this manner, with the ultrasound diagnostic apparatus of the second embodiment, since the superimposed display unit 25 superimposes and displays only the insertion object J detected by the insertion object detection unit 24 on the ultrasound image U of the latest frame in a case where the angle A of the ultrasound probe 1A is within the predetermined angle range, that is, superimposes and displays only the insertion object J detected from the ultrasound image U representing the tomographic plane substantially perpendicular to the traveling direction of the blood vessel B of the subject on the ultrasound image U, the examiner can accurately understand the actual depth position of the insertion object J by checking the insertion object J superimposed and displayed on the ultrasound image U.

An example has been described in which an angle based on the predetermined angle range is set on the basis of the input operation by the examiner via the input device 30, but for example, the superimposed display unit 25 can set, as a reference angle, the angle A of the ultrasound probe 1 at a time point at which a predetermined time such as several seconds has elapsed from the start of the ultrasonography.

Thereby, it is possible to save the trouble of the examiner in a case of setting the reference angle of the ultrasound probe 1, and the examiner can smoothly perform the ultrasonography.

It has been described that an angle detection unit that detects the angle A of the ultrasound probe 1A consists of the angle sensor 61, but for example, the angle detection unit can include a relative angle calculation unit (not illustrated) that calculates a relative angle between the ultrasound probe 1A and an anatomical structure in the subject such as the blood vessel B or the nerve on the basis of the angle A of the ultrasound probe 1A detected by the angle sensor 61 and the ultrasound image U. For example, the relative angle calculation unit can calculate an angle formed by the ultrasound probe 1A and the traveling direction of the blood vessel B, the nerve, or the like in the subject, in the tomographic plane represented by the ultrasound image U on the assumption that the depth direction of the ultrasound image U is the orientation of the ultrasound probe 1A. The relative angle calculation unit can calculate a relative angle between the ultrasound probe 1A and the anatomical structure in the subject such as the blood vessel B or the nerve, on the basis of the calculated angle as described above and the angle A of the ultrasound probe 1A detected by the angle sensor 61.

Here, in a case where the relative angle between the ultrasound probe 1A and the traveling direction of the blood vessel B is calculated, the superimposed display unit 25 can set the reference angle of the predetermined angle range to 90 degrees, for example. Thereby, in a case where the insertion object J is inserted into the blood vessel B of the subject, since the insertion object J detected from the ultrasound image U representing the tomographic plane substantially perpendicular to the traveling direction of the blood vessel B is displayed on the monitor 23, the examiner can accurately understand the actual depth position of the insertion object J.

In a case where the insertion object J is inserted into the blood vessel B of the subject, in some cases, the ultrasound image U representing the tomographic plane perpendicular to a direction in which the insertion object J extends is acquired in order to clearly image the insertion object J. Thus, the relative angle calculation unit can also calculate a relative angle between the ultrasound probe 1A and the insertion object J on the basis of the angle A of the ultrasound probe 1A detected by the angle sensor 61 and the ultrasound image U. In this case, since the superimposed display unit 25 displays the insertion object J detected from the ultrasound image U in which the insertion object J is clearly imaged, on the monitor 23, for example, the superimposed display unit 25 can set the reference angle of the predetermined angle range to 90 degrees.

Third Embodiment

In the second embodiment, the angle sensor 61 is used as the angle detection unit that detects the angle A of the ultrasound probe 1A, but the configuration of the angle detection unit is not particularly limited as long as the angle A of the ultrasound probe 1A can be detected. The angle detection unit can have a configuration that detects the angle A of the ultrasound probe 1A by analyzing an optical image of the ultrasound probe 1A captured by an optical camera, for example.

Figure 15:
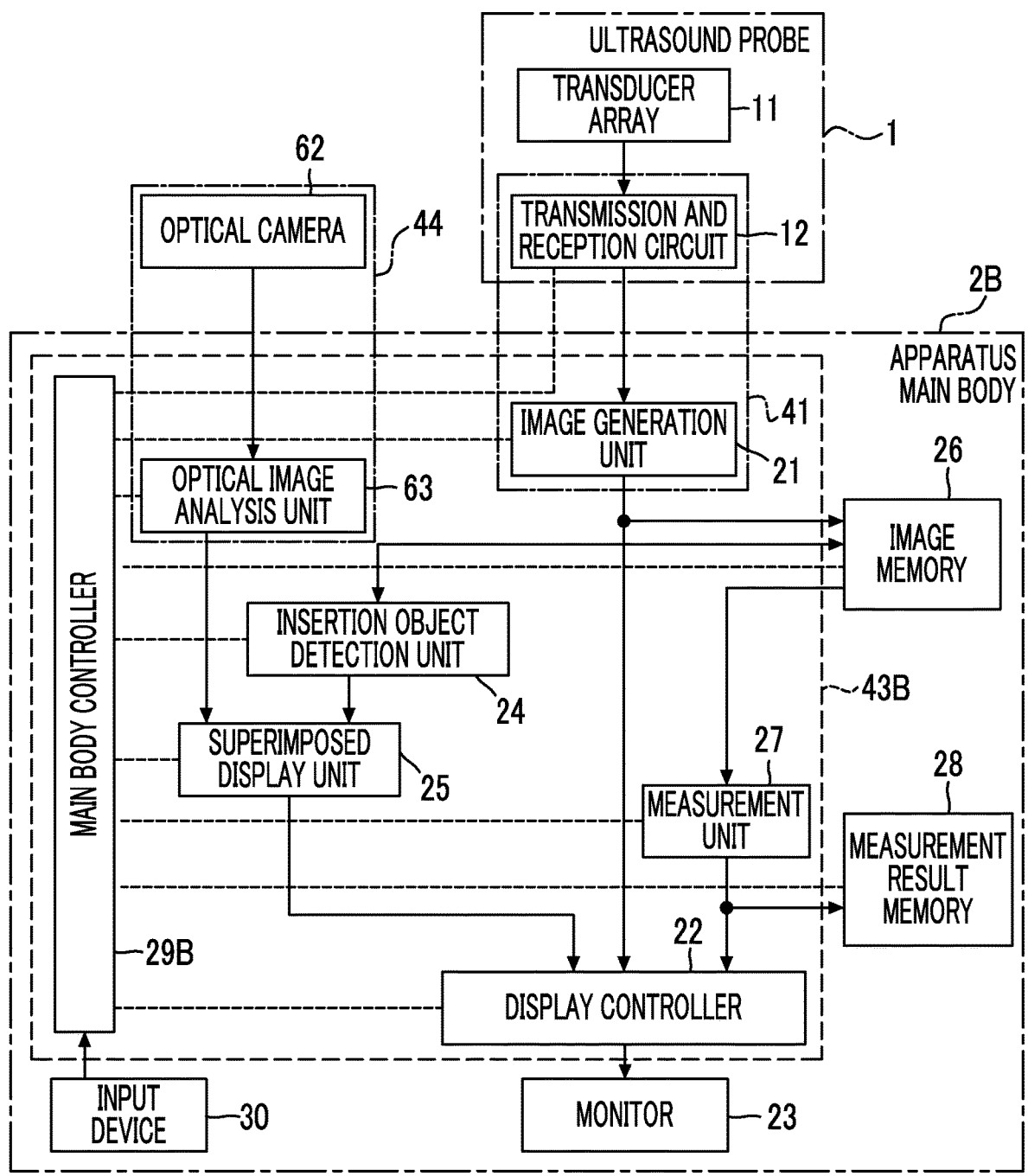
FIG. 15 is a block diagram illustrating a configuration of an ultrasound diagnostic apparatus according to a third embodiment of the present invention.

FIG. 15 illustrates a configuration of an ultrasound diagnostic apparatus according to a third embodiment. The ultrasound diagnostic apparatus of the third embodiment is obtained by adding an optical camera 62 and including an apparatus main body 2B instead of the apparatus main body 2 in the ultrasound diagnostic apparatus of the first embodiment illustrated in FIG. 1.

The apparatus main body 2B is obtained by adding an optical image analysis unit 63 and including a main body controller 29B instead of the main body controller 29 in the apparatus main body 2 in the first embodiment. In the apparatus main body 2B, the optical camera 62 and the main body controller 29B are connected to the optical image analysis unit 63. The optical image analysis unit 63 is connected to the superimposed display unit 25. Further, the image generation unit 21, the display controller 22, the insertion object detection unit 24, the superimposed display unit 25, the measurement unit 27, the main body controller 29B, and the optical image analysis unit 63 constitute a processor 43B for the apparatus main body 2B. The optical camera 62 and the optical image analysis unit 63 of the apparatus main body 2B constitute an angle detection unit 44.

The optical camera 62 includes an image sensor such as a so-called charge coupled device (CCD) image sensor or a so-called a complementary metal-oxide-semiconductor (CMOS) image sensor, and images the ultrasound probe 1 to acquire an optical image. The optical camera 62 sends the acquired optical image to the optical image analysis unit 63.

The optical image analysis unit 63 detects the angle A of the ultrasound probe 1 by analyzing the optical image acquired by the optical camera 62. For example, the optical image analysis unit 63 can detect, as the angle A, an absolute angle with the downward direction in the vertical direction as 0 degrees on the basis of the posture of the ultrasound probe 1 in a three-dimensional space. For example, the optical image analysis unit 63 can detect, as the angle A, a relative angle that is an angle formed by the ultrasound probe 1 and the body surface S of the subject, by analyzing a relationship between the ultrasound probe 1 and the body surface S of the subject in the optical image.

For example, the optical image analysis unit 63 can store a plurality of different template images representing the ultrasound probe 1, search the optical images by a so-called template matching method using the plurality of template images, detect the ultrasound probe 1, and detect the angle A of the detected ultrasound probe 1. The optical image analysis unit 63 can detect the ultrasound probe 1 by using, for example, a machine learning method described in Csurka et al.: Visual Categorization with Bags of Keypoints, Proc. of ECCV Workshop on Statistical Learning in Computer Vision, pp. 59-74 (2004), or a general image recognition method using deep learning described in Krizhevsk et al.: ImageNet Classification with Deep Convolutional Neural Networks, Advances in Neural Information Processing Systems 25, pp. 1106-1114 (2012), and detect the angle A of the ultrasound probe 1.

Similar to the superimposed display unit 25 in the second embodiment, the superimposed display unit 25 determines whether or not the angle A of the ultrasound probe 1 detected by the optical image analysis unit 63 is within the predetermined angle range, and can superimpose and display only the insertion object J detected by the insertion object detection unit 24 on the ultrasound image U of the latest frame in a case where the angle A is within the angle range.

In this manner, with the ultrasound diagnostic apparatus of the third embodiment, since the superimposed display unit 25 superimposes and displays only the insertion object J detected by the insertion object detection unit 24 on the ultrasound image U of the latest frame in a case where the angle A of the ultrasound probe 1 detected by the angle detection unit 44 is within the predetermined angle range, the examiner can accurately understand the actual depth position of the insertion object J by checking the insertion object J superimposed and displayed on the ultrasound image U, as in the second embodiment.

For example, the angle detection unit 44 can include a relative angle calculation unit (not illustrated) that calculates a relative angle between the ultrasound probe 1 and the anatomical structure in the subject such as the blood vessel B or the nerve on the basis of the angle A of the ultrasound probe 1 detected by the optical image analysis unit 63 and the ultrasound image U. For example, the relative angle calculation unit can calculate an angle formed by the ultrasound probe 1 and the traveling direction of the blood vessel B, the nerve, or the like in the subject, in the tomographic plane represented by the ultrasound image U on the assumption that the depth direction of the ultrasound image U is the orientation of the ultrasound probe 1. The relative angle calculation unit can calculate a relative angle between the ultrasound probe 1 and the anatomical structure in the subject such as the blood vessel B or the nerve, on the basis of the calculated angle as described above and the angle A of the ultrasound probe 1 detected by the optical image analysis unit 63.

Here, in a case where the relative angle between the ultrasound probe 1 and the traveling direction of the blood vessel B is calculated, the superimposed display unit 25 can set the reference angle of the predetermined angle range to 90 degrees, for example. Thereby, in a case where the insertion object J is inserted into the blood vessel B of the subject, since the insertion object J detected from the ultrasound image U representing the tomographic plane substantially perpendicular to the traveling direction of the blood vessel B is displayed on the monitor 23, the examiner can accurately understand the actual depth position of the insertion object J.

In a case where the insertion object J is inserted into the blood vessel B of the subject, in some cases, the ultrasound image U representing the tomographic plane perpendicular to a direction in which the insertion object J extends is acquired in order to clearly image the insertion object J. Thus, the relative angle calculation unit can also calculate a relative angle between the ultrasound probe 1 and the insertion object J on the basis of the angle A of the ultrasound probe 1 detected by the optical image analysis unit 63 and the ultrasound image U. In this case, since the superimposed display unit 25 displays the insertion object J detected from the ultrasound image U in which the insertion object J is clearly imaged, on the monitor 23, for example, the superimposed display unit 25 can set the reference angle of the predetermined angle range to 90 degrees.

Fourth Embodiment

In a case where ultrasound beams are transmitted at an angle of 90 degrees with respect to an extension direction of the insertion object J, the intensity of ultrasound echoes from the insertion object J is increased as compared with a case where ultrasound beams are transmitted at an angle inclined with respect to 90 degrees. In this manner, it can be seen that the brightness of the insertion object J in the ultrasound image U is changed according to the angle A of the ultrasound probe 1. In a case where the angle A of the ultrasound probe 1 is changed, the tomographic plane in the subject to be scanned is changed, and therefore, the overall brightness of the background image excluding the region of the insertion object J from the ultrasound image U is also changed.

Thus, the ultrasound diagnostic apparatus can superimpose and display the insertion object J on the ultrasound image U on the basis of a brightness change rate of the insertion object J or a brightness change rate of the entire background image in the ultrasound images U of the plurality of frames, instead of the angle A of the ultrasound probe 1, for example.

Figure 16:
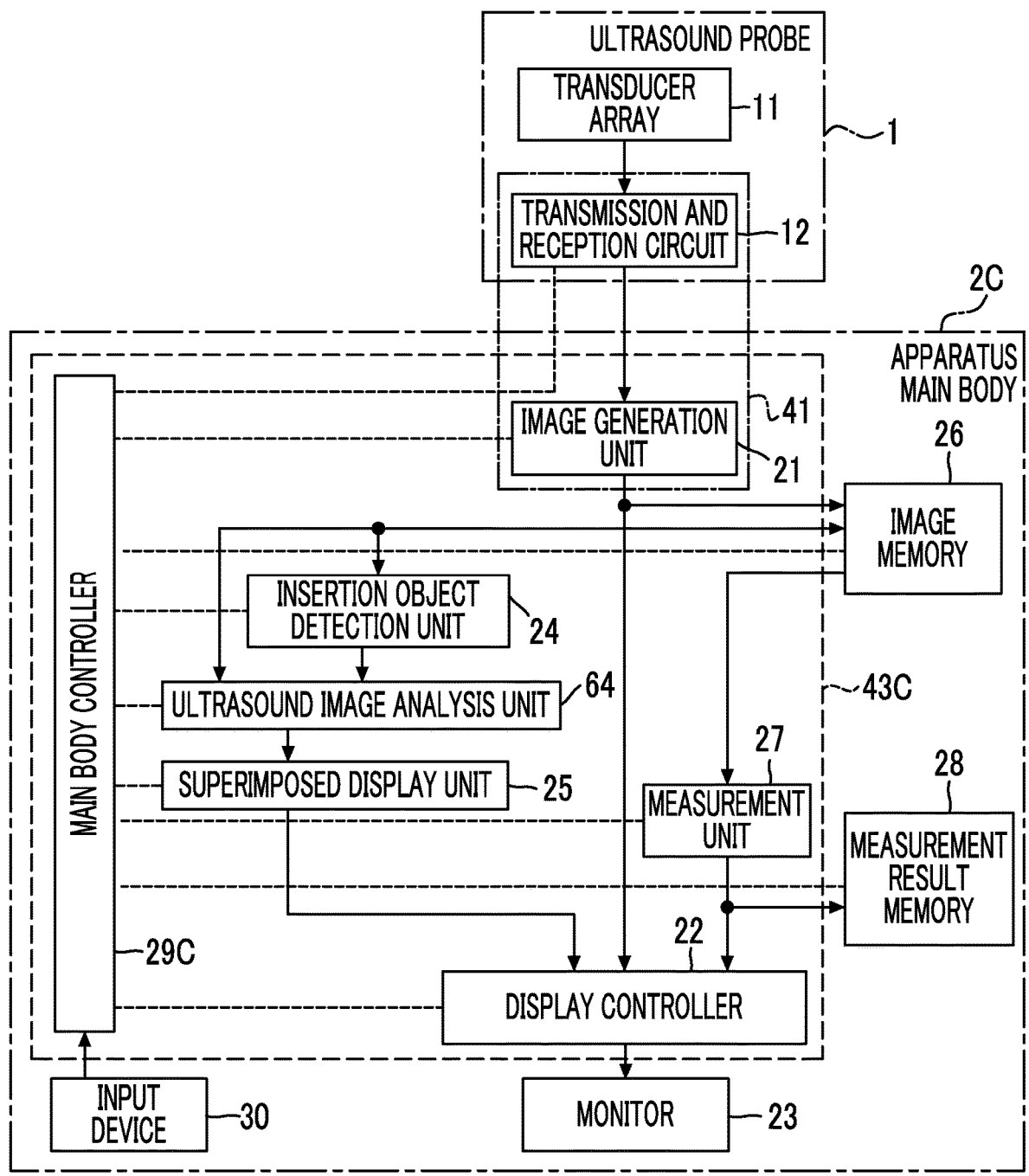
FIG. 16 is a block diagram illustrating a configuration of an ultrasound diagnostic apparatus according to a fourth embodiment of the present invention.

FIG. 16 illustrates a configuration of an ultrasound diagnostic apparatus according to a fourth embodiment. The ultrasound diagnostic apparatus of the fourth embodiment is obtained by including an apparatus main body 2C instead of the apparatus main body 2 in the ultrasound diagnostic apparatus of the first embodiment illustrated in FIG. 1. The apparatus main body 2C is obtained by adding an ultrasound image analysis unit 64 and including a main body controller 29C instead of the main body controller 29 in the apparatus main body 2 in the first embodiment.

In the apparatus main body 2C, the ultrasound image analysis unit 64 is connected to the insertion object detection unit 24 and the image memory 26. The ultrasound image analysis unit 64 is connected to the superimposed display unit 25 and the main body controller 29C. Further, the image generation unit 21, the display controller 22, the insertion object detection unit 24, the superimposed display unit 25, the measurement unit 27, the main body controller 29C, and the ultrasound image analysis unit 64 constitute a processor 43C for the apparatus main body 2C.

The ultrasound image analysis unit 64 analyzes the ultrasound images U of the plurality of frames generated by the image generation unit 21, acquires the brightness of the image of each insertion object J detected from the ultrasound images U of the plurality of frames by the insertion object detection unit 24, and calculates the brightness change rate of the images of the plurality of detected insertion objects J. For example, the ultrasound image analysis unit 64 can calculate an average value of the brightness of the region representing the insertion object J as the brightness of the image of the insertion object J included in each ultrasound image U.

The ultrasound image analysis unit 64 can analyze the ultrasound images U of the plurality of frames generated by the image generation unit 21, acquire the brightness of the background image other than the insertion object J detected by the insertion object detection unit 24 in the ultrasound images U of the plurality of frames, and calculate the change rate of the acquired brightness of the plurality of background images. For example, the ultrasound image analysis unit 64 can calculate an average value of the brightness of the entire background image as the brightness of each background image.

Here, since the brightness change rate of the image of the insertion object J is changed according to the angle range of the ultrasound probe 1, the ultrasound image U is acquired such that the brightness change rate of the image of the insertion object J is within the predetermined range based on the brightness of the image of the insertion object J at the angle A of the ultrasound probe 1 at which the tomographic plane perpendicular to the traveling direction of the blood vessel B can be imaged, and thereby the ultrasound image U representing the tomographic plane substantially perpendicular to the traveling direction of the blood vessel B can be acquired.

Further, similar to the brightness change rate of the image of the insertion object J, the brightness change rate of the background image is also changed according to the angle range of the ultrasound probe 1, the ultrasound image U is acquired such that the brightness change rate of the background image is within the predetermined range based on the brightness of the background image at the angle A of the ultrasound probe 1 at which the tomographic plane perpendicular to the traveling direction of the blood vessel B can be imaged, and thereby the ultrasound image U representing the tomographic plane substantially perpendicular to the traveling direction of the blood vessel B can be acquired.

Thus, the superimposed display unit 25 can superimpose and display only the insertion object J of which the brightness change rate calculated by the ultrasound image analysis unit 64 is within the predetermined range, on the ultrasound image U of the latest frame. In this case, for example, the superimposed display unit 25 can set a predetermined range of the brightness change rate based on the brightness of the insertion object J or the brightness of the background image in the ultrasound image U acquired at any angle A of the ultrasound probe 1 on the basis of the input operation by the examiner via the input device 30. Thereby, only the insertion object J detected from the ultrasound image U representing the tomographic plane substantially perpendicular to the traveling direction of the blood vessel B of the subject can be superimposed and displayed on the ultrasound image U.

In this manner, with the ultrasound diagnostic apparatus of the fourth embodiment, since the superimposed display unit 25 superimposes and displays only the insertion object J detected by the insertion object detection unit 24 on the ultrasound image U of the latest frame in a case where the brightness change rate calculated by the ultrasound image analysis unit 64 is within the predetermined range, the examiner can accurately understand the actual depth position of the insertion object J by checking the insertion object J superimposed and displayed on the ultrasound image U, as in the second and third embodiments.

Fifth Embodiment

As illustrated in FIG. 4, since the insertion object J is inserted into the subject by being slightly inclined toward the deeper side of the subject approximately along the traveling direction of the blood vessel B, in a case where the examiner causes the insertion object J to advance, the distal end of the insertion object J gradually approaches the so-called posterior vascular wall. Thus, in order to prevent accidents such as penetration of the posterior vascular wall by the distal end of the insertion object J by allowing the examiner to understand the depth position of the distal end of the insertion object J, the ultrasound diagnostic apparatus can superimpose and display the distal end of the insertion object J on the ultrasound image U of the latest frame.

Figure 17:
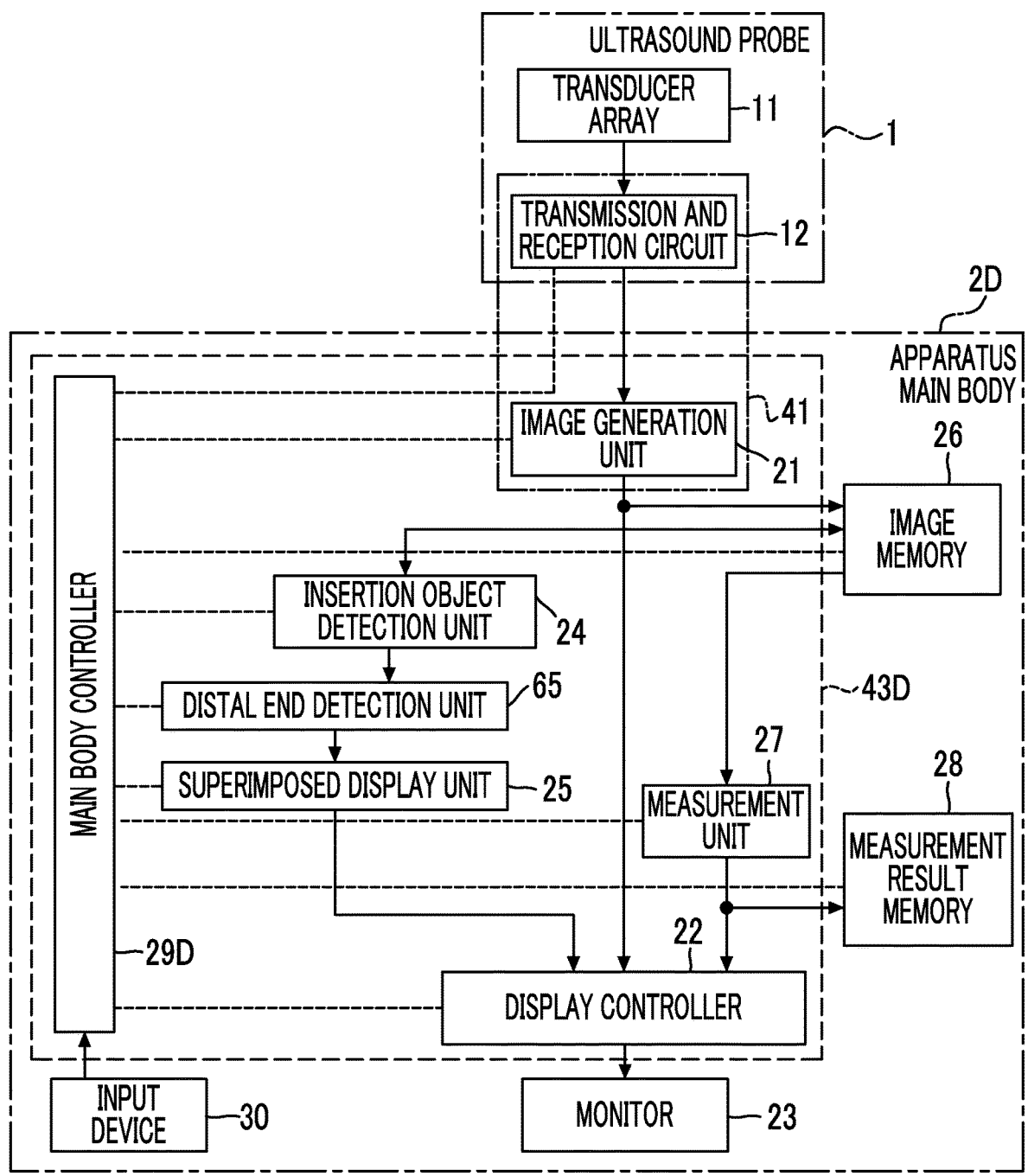
FIG. 17 is a block diagram illustrating a configuration of an ultrasound diagnostic apparatus according to a fifth embodiment of the present invention.

FIG. 17 illustrates a configuration of an ultrasound diagnostic apparatus according to a fifth embodiment. The ultrasound diagnostic apparatus of the fifth embodiment is obtained by including an apparatus main body 2D instead of the apparatus main body 2 in the ultrasound diagnostic apparatus of the first embodiment illustrated in FIG. 1. The apparatus main body 2D is obtained by adding a distal end detection unit 65 and including a main body controller 29D instead of the main body controller 29 in the apparatus main body 2 in the first embodiment.

In the apparatus main body 2D, the distal end detection unit 65 is connected to the insertion object detection unit 24. The distal end detection unit 65 is connected to the superimposed display unit 25 and the main body controller 29D. Further, the image generation unit 21, the display controller 22, the insertion object detection unit 24, the superimposed display unit 25, the measurement unit 27, the main body controller 29D, and the distal end detection unit 65 constitute a processor 43D for the apparatus main body 2D.

The distal end detection unit 65 detects the distal end of the insertion object J detected from the ultrasound images U of the plurality of frames by the insertion object detection unit 24. Here, in a state where the position of the insertion object J is fixed in the subject, in a case where the ultrasound images U of the plurality of frames are captured while the ultrasound probe 1 is moved in parallel in a direction from the middle portion to the distal end of the insertion object J, the ultrasound image U in which the cross section of the insertion object J is shown is obtained to the middle, but the ultrasound image U in which the insertion object J is not shown is obtained from the middle. In this case, in the ultrasound images U of the plurality of consecutive frames, it can be determined that the insertion object J shown in the ultrasound image U of the frame immediately before the insertion object J disappears represents the distal end of the insertion object J. Thus, for example, the distal end detection unit 65 can detect the insertion object J shown in the ultrasound image U of the frame immediately before the insertion object J detected from the ultrasound images U of the plurality of consecutive frames by the insertion object detection unit 24 disappears, as the distal end of the insertion object J.

Since the distal end of the puncture needle is sharp and has a shape different from the middle portion, a brightness pattern of the distal end of the puncture needle and a brightness pattern of the middle portion of the puncture needle are different from each other. Therefore, in a case where the insertion object J is a puncture needle, the distal end detection unit 65 can acquire a brightness pattern of the insertion object J detected from the ultrasound images U of the plurality of consecutive frames by the insertion object detection unit 24, and detect the distal end of the insertion object J by analyzing the acquired brightness pattern.

In this case, for example, the distal end detection unit 65 can store a plurality of template patterns representing the brightness pattern of the distal end of the insertion object J, and detect the distal end of the insertion object J by a template matching method using the plurality of template patterns. The distal end detection unit 65 can detect the distal end of the insertion object J by using, for example, a machine learning method described in Csurka et al.: Visual Categorization with Bags of Keypoints, Proc. of ECCV Workshop on Statistical Learning in Computer Vision, pp. 59-74 (2004), or a general image recognition method using deep learning described in Krizhevsk et al.: ImageNet Classification with Deep Convolutional Neural Networks, Advances in Neural Information Processing Systems 25, pp. 1106-1114 (2012).

The superimposed display unit 25 can superimpose and display only the distal end of the insertion object J detected by the distal end detection unit 65 on the ultrasound image U of the latest frame.

In this manner, with the ultrasound diagnostic apparatus of the fifth embodiment, since the distal end of the insertion object J is detected by the distal end detection unit 65 and only the detected distal end of the insertion object J is superimposed and displayed on the ultrasound image U of the latest frame by the superimposed display unit 25, the examiner can easily understand the depth position of the distal end of the insertion object J by checking the insertion object J superimposed and displayed on the ultrasound image U, and prevent accidents such as penetration of the posterior vascular wall by the distal end of the insertion object J.

Further, it is described that the form of the fifth embodiment is applied to the first embodiment, but the form of the fifth embodiment can be similarly applied to the second to fourth embodiments. That is, the distal end detection unit 65 can be provided to the ultrasound diagnostic apparatuses of the second to fourth embodiments, as in the ultrasound diagnostic apparatus of the fifth embodiment.

EXPLANATION OF REFERENCES 1, 1A: ultrasound probe
2, 2A, 2B, 2C, 2D: apparatus main body
11: transducer array
12: transmission and reception circuit
21: image generation unit
22: display controller
23: monitor
24: insertion object detection unit
25: superimposed display unit
26: image memory
27: measurement unit
28: measurement result memory
29, 29A, 29B, 29C, 29D: main body controller
30: input device
41: image acquisition unit
43, 43A, 43B, 43C, 43D: processor
51: pulser
52: amplification unit
53: AD conversion unit
54: beam former
55: signal processing unit
56: DSC
57: image processing unit
61: angle sensor
62: optical camera
63: optical image analysis unit
64: ultrasound image analysis unit
65: distal end detection unit
A: angle
B: blood vessel
J, K1, K2, K3, K4: insertion object
K5, K6, K7, K8: contour line
K9, K10, K11, K12: figure
K13, K14, K15, K16: center point
K17, K18, K19, K20: lateral line
K21, K22, K23, K24: indicator
L: connection line
S: body surface
U: ultrasound image

What is claimed is:

1. An ultrasound diagnostic apparatus comprising:
an ultrasound probe;
a monitor;
a processor configured to:
acquire ultrasound images of a plurality of frames in which a cross section of a blood vessel of a subject is consecutively imaged while the ultrasound probe is moved,
detect an insertion object inserted into the subject, from each of the ultrasound images of the plurality of frames,
sequentially detect tilt angles of the ultrasound probe,
superimpose at least one geometric figure representing at least one position of the insertion object detected only at a tilt angle of the ultrasound probe within a predetermined angle range among multiple positions of the insertion object detected from the ultrasound images of the plurality of frames, on the ultrasound image of a latest frame among the ultrasound images of the plurality of frames, where the predetermined angle range has a central angle, and the central angle is set based on a traveling direction of the blood vessel, and
display the at least one geometric figure on the monitor.

2. The ultrasound diagnostic apparatus according to claim 1,
wherein the processor is further configured to superimpose and display a geometric figure corresponding to at least a deepest position of the insertion object among the at least one position of the insertion object detected from the ultrasound images of the plurality of frames in a unique display format.

3. The ultrasound diagnostic apparatus according to claim 1,
wherein the processor is further configured to superimpose and display the at least one geometric figure, by lowering brightness or saturation of the at least one geometric figure such that brightness or saturation of a geometric figure corresponding to older frame is lower than that of a geometric figure corresponding to newer frame.

4. The ultrasound diagnostic apparatus according to claim 1,
wherein the processor is further configured to superimpose and display only a geometric figure corresponding to a position of the insertion object which is detected within a predetermined time range from the latest frame, among the at least one geometric figure.

5. The ultrasound diagnostic apparatus according to claim 3,
wherein the processor is further configured to superimpose and display only a geometric figure corresponding to a position of the insertion object which is detected within a predetermined time range from the latest frame, among the at least one geometric figure.

6. The ultrasound diagnostic apparatus according to claim 1,
wherein the processor is further configured to superimpose and display only a geometric figure corresponding to a position of the insertion object positioned within a predetermined depth range with respect to the insertion object detected from the ultrasound image of the latest frame, among the at least one geometric figure.

7. The ultrasound diagnostic apparatus according to claim 6,
wherein the processor is further configured to superimpose and display only a geometric figure corresponding to a position of the insertion object positioned within a predetermined width range orthogonal to a depth direction with respect to the insertion object detected from the ultrasound image of the latest frame, among the at least one geometric figure.

8. The ultrasound diagnostic apparatus according to claim 1, further comprising:
an angle sensing device disposed in the ultrasound probe,
wherein the processor is configured to sequentially detect the tilt angles of the ultrasound probe based on a signal from the angle sensing device.

9. The ultrasound diagnostic apparatus according to claim 1, further comprising:
an optical camera configured to image the ultrasound probe to acquire an optical image,
wherein the processor is configured to sequentially detect the tilt angles of the ultrasound probe by analyzing the optical image acquired by the optical camera.

10. The ultrasound diagnostic apparatus according to claim 1,
  wherein the processor is configured to:
  calculate a brightness change rate of a plurality of insertion objects detected from the ultrasound images of the plurality of frames, and
  superimpose and display only a geometric figure corresponding to a position of an insertion object of which the brightness change rate is within a predetermined range.

11. The ultrasound diagnostic apparatus according to claim 2,
  wherein the processor is configured to:
  calculate a brightness change rate of a plurality of insertion objects detected from the ultrasound images of the plurality of frames, and
  superimpose and display only a geometric figure corresponding to a position of an insertion object of which the brightness change rate is within a predetermined range.

12. The ultrasound diagnostic apparatus according to claim 1,
  the processor is configured to:
  calculate a brightness change rate of a background image other than the insertion object in the ultrasound images of the plurality of frames, and
  superimpose and display only a geometric figure corresponding to a position of the insertion object detected from the ultrasound image of the frame of which the brightness change rate of the background image is within a predetermined range.

13. The ultrasound diagnostic apparatus according to claim 1,
  the processor is further configured to:
  detect a distal end of the insertion object detected from the ultrasound images of the plurality of frames, and
  superimpose and display only a geometric figure corresponding to a position of the distal end of the insertion object.

14. A control method of an ultrasound diagnostic apparatus, the control method comprising:
  acquiring ultrasound images of a plurality of frames in which a cross section of a blood vessel of a subject is consecutively imaged while an ultrasound probe is moved;
  detecting an insertion object inserted into the subject, from each of the ultrasound images of the plurality of frames;
  sequentially detecting tilt angles of the ultrasound probe;
  superimposing at least one geometric figure representing at least one position of the insertion object detected only at a tilt angle of the ultrasound probe within a predetermined angle range among multiple positions of the insertion object detected from the ultrasound images of the plurality of frames, on the ultrasound image of a latest frame among the ultrasound images of the plurality of frames, where the predetermined angle range has a central angle, and the central angle is set based on a traveling direction of the blood vessel; and
  displaying the at least one geometric figure on a monitor.

* * * * *